United States Patent [19]
McGee

[11] 3,760,906
[45] Sept. 25, 1973

[54] JACK ASSEMBLY FOR STABILIZING HOUSE TRAILER

[76] Inventor: Leland T. McGee, 3107 Euclid St., Lynwood, Calif.

[22] Filed: Jan. 20, 1971

[21] Appl. No.: 107,982

[52] U.S. Cl. ............... 188/4 R, 188/2 R, 254/86 R, 280/150.5
[51] Int. Cl. .............................................. B60t 1/00
[58] Field of Search ................. 280/150.5; 188/2 R, 188/150 R, 74, 4 R; 254/86 R

[56] References Cited
UNITED STATES PATENTS

| | | | |
|---|---|---|---|
| 2,885,181 | 5/1959 | McCully | 254/86 R |
| 3,059,728 | 10/1962 | McKuskie | 188/74 |
| 3,642,242 | 2/1972 | Danekas | 280/150.5 |
| 3,093,362 | 6/1963 | Schaefer | 280/150.5 |

Primary Examiner—Benjamin Hersh
Assistant Examiner—Robert R. Song
Attorney—Smyth, Roston & Pavitt

[57] ABSTRACT

A manually-operable jack means applies lift force to one side of a frame of a parked trailer to cooperate with a similar jack means on the other side of the frame to stabilize the trailer. Each jack means has brake shoe means to immobilize at least one ground wheel of the trailer. In one embodiment a pair of brake shoes is lifted into wedging engagement with a pair of ground wheels on one side of the trailer. In another embodiment a single manually-operable mechanism of the jack means employs toggle links both for the purpose of lifting the trailer frame and for the purpose of braking at least one trailer wheel.

48 Claims, 11 Drawing Figures

INVENTOR.
LELAND T. McGEE,
By Smyth, Roston & Pavitt
ATTORNEYS.

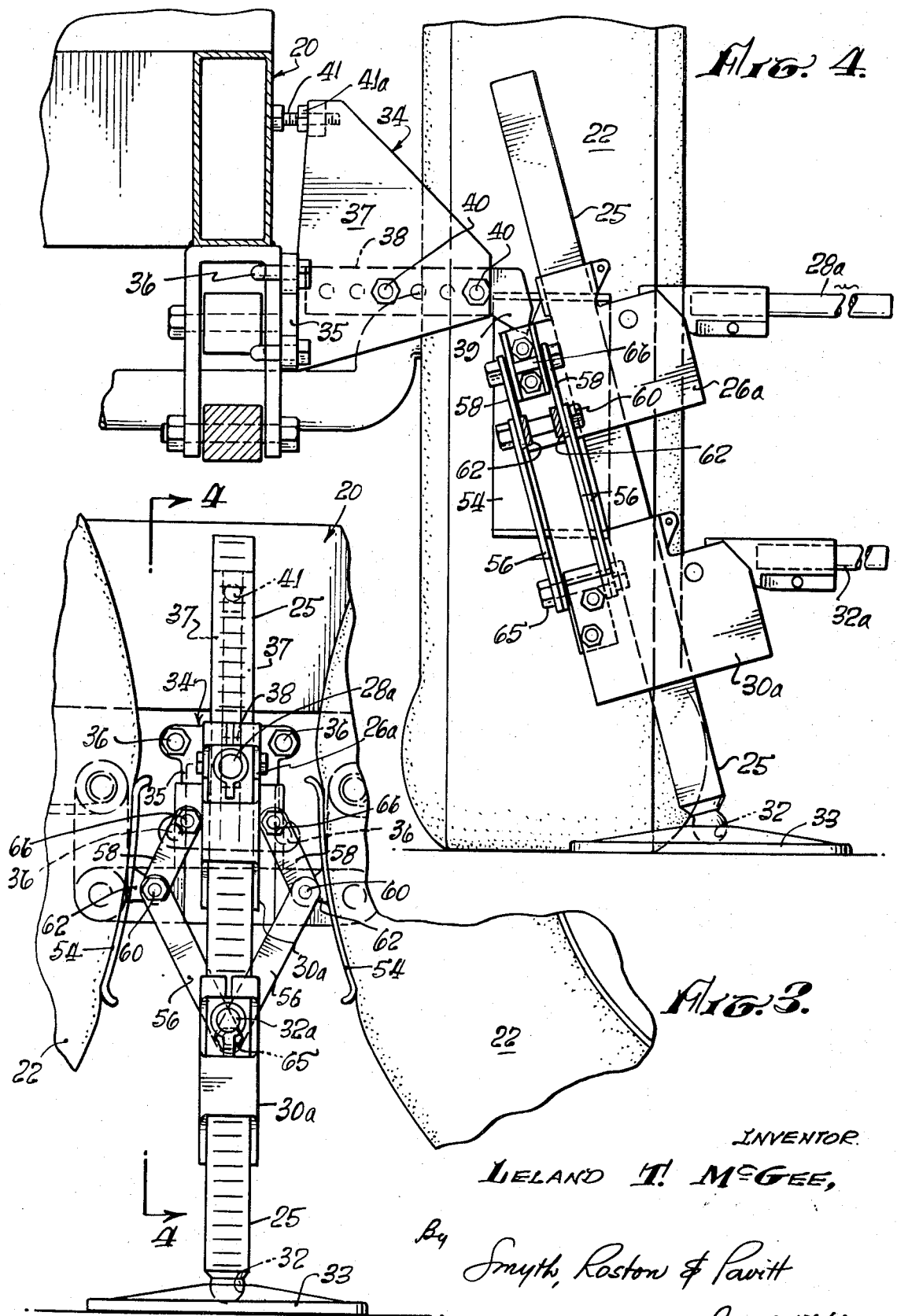

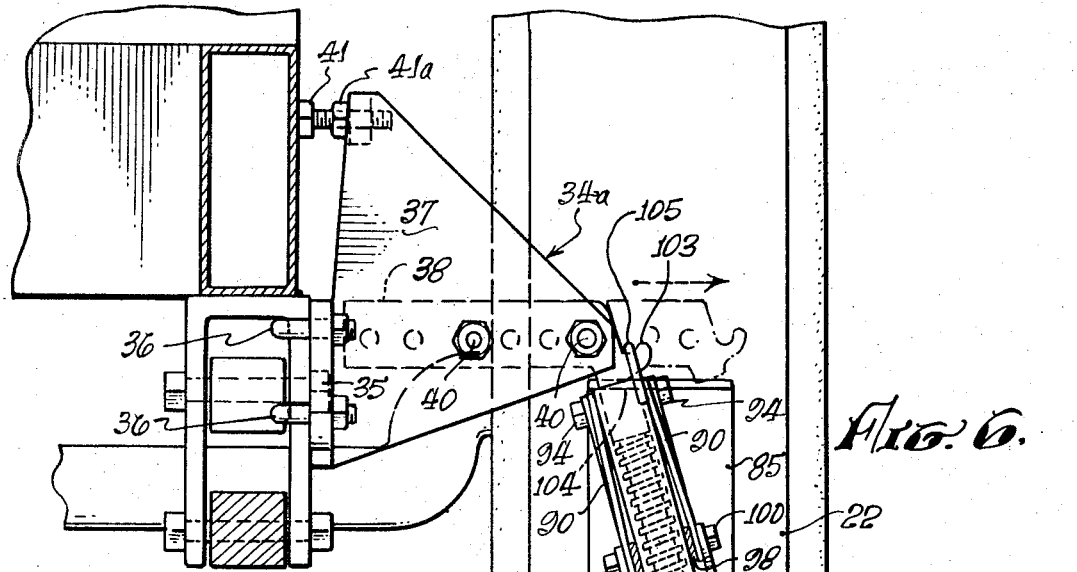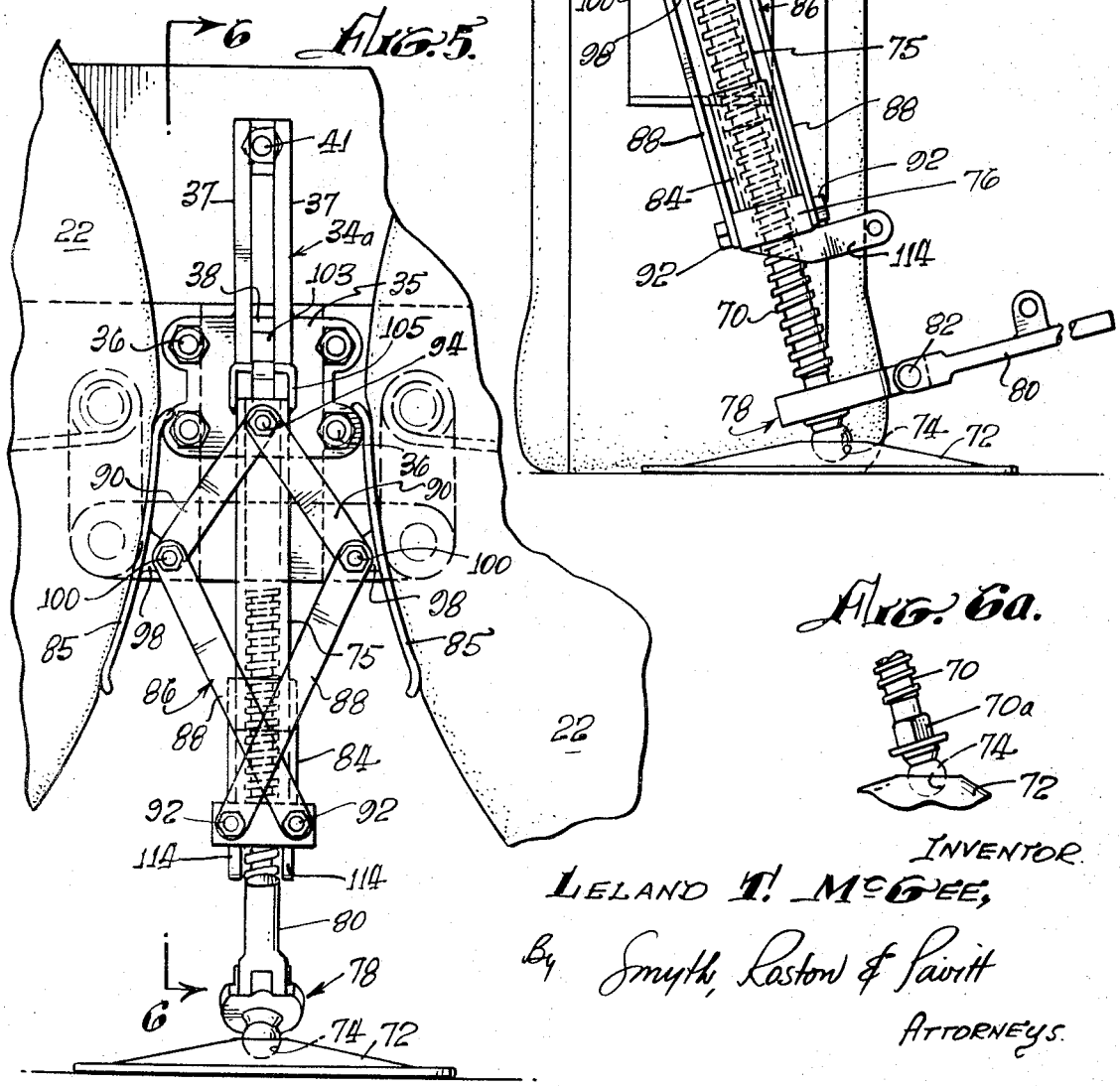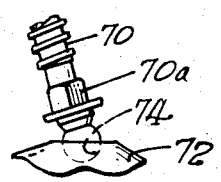

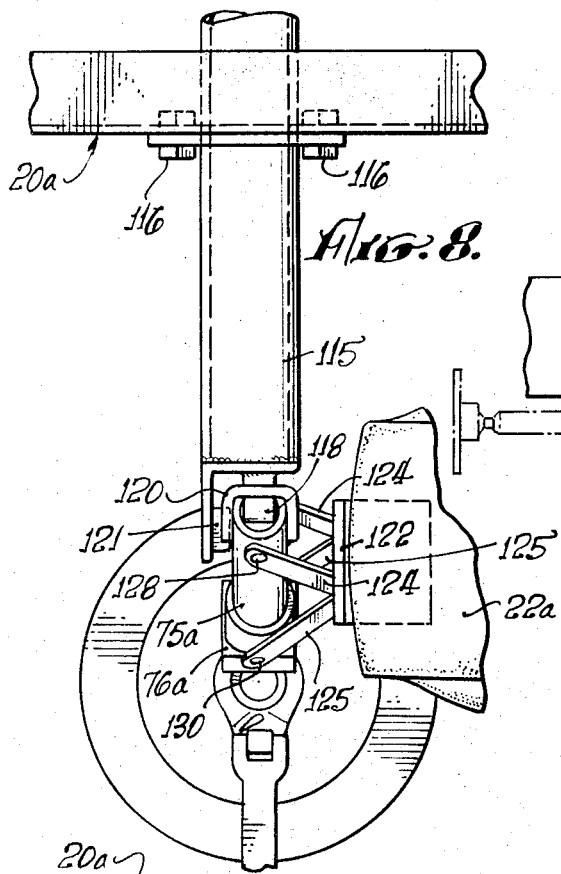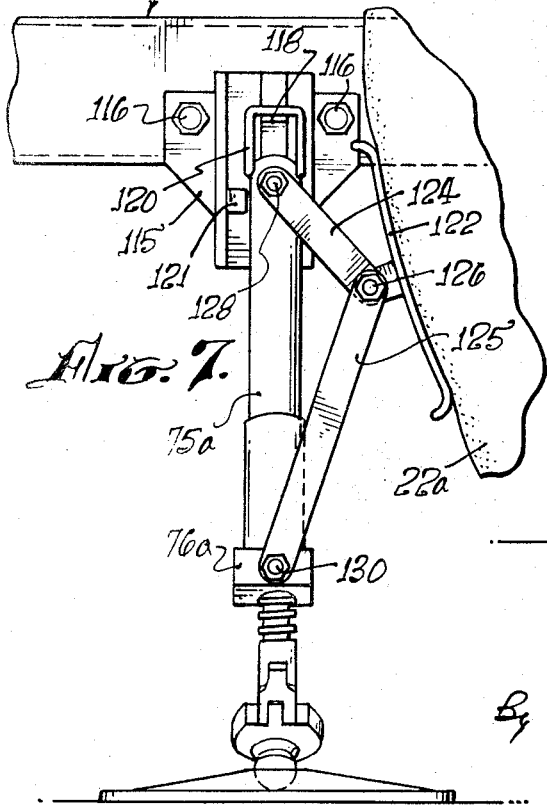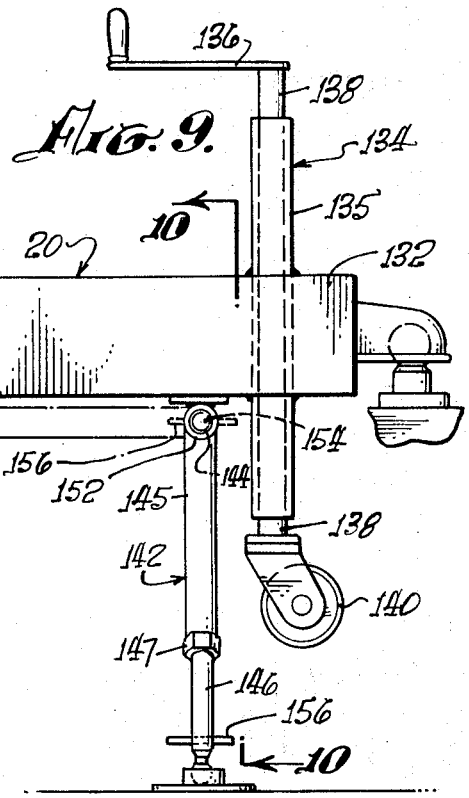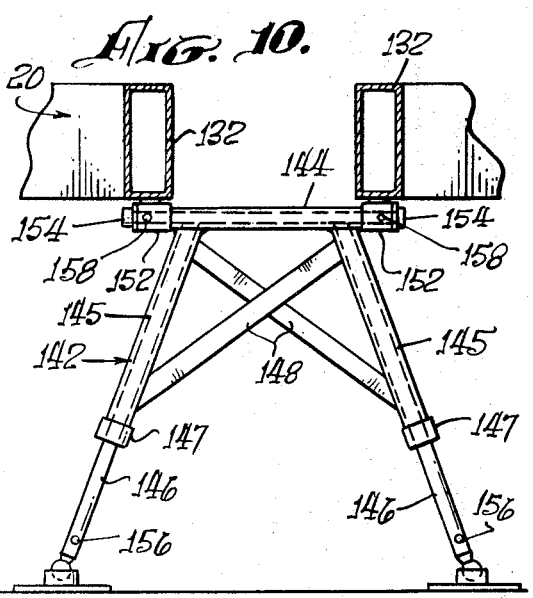

JACK ASSEMBLY FOR STABILIZING HOUSE TRAILER

BACKGROUND OF THE INVENTION

When a house trailer is brought to rest, the floor of the trailer is unstable and too sensitive to movements of the occupants because the frame is floatingly carried by the trailer springs. With the trailer frame supported in such a yielding manner it is free not only to respond vertically to changes in the magnitude of the imposed load but also to work laterally in response to transverse changes in the location of the load and to rock longitudinally in response to longitudinal shifts of the imposed load. In addition, the yieldingly supported frame is free to reciprocate both laterally and longitudinally in its plane.

For these reasons various expedience are commonly employed to stabilize a trailer when the trailer is to remain parked for a period of time. Simple jacks may be used on opposite sides of the trailer frame to take a substantial portion of the weight off the springs but the wheels must be immobilized by chocks or the like to keep the trailer from shifting longitudinally. If the opposite jacks lean toward each other they serve not only to prevent lateral rocking of the trailer frame but also to prevent lateral shift of the frame. Two jacks employed in this way can be adjusted to level the trailer floor transversely but cannot level the floor longitudinally and do not prevent longitudinal rocking of the trailer frame. Complete stabilization can be accomplished, however, by employing two spaced jacks on each side of the trailer.

Trailer owners may resort to various improvisations to alleviate the situation without fully solving the problem. Some may take the trouble to lift the four corners of the trailer frame onto solid supports. One difficulty with this solution is that either the bulky solid supports must be transported by the trailer or a set of solid supports must be acquired each time the trailer is parked. Another difficulty is that it is a time-consuming task to raise a trailer frame onto the four solid supports. Consequently, this solution is not the answer unless the trailer is to be parked at one location for a long period of time.

One prior solution to the problem is to hingedly mount four mechanical jacks on the underside of the trailer frame to fold up out of the way when the trailer travels. Four jacks, however, cannot keep a frame from twisting. Another disadvantage is that the four jacks are fully exposed when the trailer is traveling. Another drawback is that the four jacks are relatively expensive and if a trailer is sold the four permanently mounted jacks go with the trailer.

Another prior art answer to the problem is to equip the trailer with a single pair of hydraulic jacks that can be folded up out of the way. The hydraulic jacks are relatively expensive and, as heretofore emphasized, a single pair of jacks cannot provide complete stabilization of a trailer frame.

Another prior art solution is a set of four foldable hydraulic jacks that are operable from a control station. The four remotely controlled jacks solve the problem and certainly save time and effort but the cost is too high for the average trailer owner.

What is needed is a fully satisfactory solution to the problem that saves time and labor but is relatively inexpensive.

SUMMARY OF THE INVENTION

For complete stabilization of a trailer, the invention provides two mechanical jack-type stabilizers for use at central points on the opposite sides respectively of the trailer and provides a third support in the form of an adjustable auxiliary frame to be used in transverse position under the forward trailer tongue.

A feature of the invention is that each of the two jack-type stabilizers is provided with shoe means to function in the manner of brake means to immobilize at least one wheel on the corresponding side of the trailer. The shoe means serves a dual purpose in that it not only serves as brake means for the trailer but also serves to stabilize the jack-type stabilizer itself.

The concept of providing a third adjustable auxiliary forward support for the trailer frame takes advantage of the fact that a trailer tongue is commonly equipped with a conventional screw-type jack operable by a crank to raise and lower the tongue. When the two side stabilizers of the invention are correctly adjusted in positions tilted inwardly of the trailer, the trailer frame is leveled transversely and is secured against both lateral rocking motion and lateral shift. The forward conventional screw jack is then cranked to raise the trailer tongue and then the tongue is lowered onto the auxiliary support frame to anchor the tongue against lateral shift, the auxiliary support frame being adjusted to level the trailer frame longitudinally. In the preferred practice of the invention, the auxiliary support frame is permanently mounted on the trailer tongue and is folded up out of the way when the trailer is traveling.

In one embodiment of the invention for use with a four-wheel trailer, each of the stabilizers for use on one side of the trailer frame has two separate conventional manually operable lifting assemblages. One of the lifting assemblages of the stabilizer is manually operable to exert lift force on the trailer frame and the other lifting assemblage is manually operable to raise a pair of brake shoes into wedging engagement with the two wheels on the side of the trailer.

In a second embodiment of the invention also for use on a four wheel trailer, the upper of two lifting assemblages on the stabilizer is manually operable to exert lift force on the trailer frame and two brake shoes are mounted on corresponding toggle linkages that are connected both to the upper lifting assemblage and to the lower lifting assemblage. Ater the upper lifting assemblage has served its purpose of exerting lift force on the trailer frame, the lower lifting assemblage is manually operated to expand the two toggle linkages for forcing the two brake shoes into pressure engagement with the two trailer wheels.

In a third embodiment of the invention also for use on a four wheel trailer, two brake shoes are mounted on corresponding toggle linkages but only a single lift mechanism is employed for the dual purpose of exerting lift force on the trailer and of expanding the toggle linkages for brake action.

In a fourth embodiment of the invention for use on a two wheel trailer, each of the two stabilizers has a single brake shoe for brake action on the single wheel on the corresponding side of the trailer and the brake shoe is mounted on a toggle linkage. A single lifting assemblage is employed both to lift the trailer frame and to expand the toggle linkage. A feature of this particular embodiment of the invention is that the trailer is equipped with fixed means to abut one side of the stabilizer to oppose the tendency for the stabilizer to shift laterally in reaction to the brake shoe pressure against the wheel.

In the preferred embodiment of the auxiliary frame that is employed under the tongue of the trailer, the auxiliary frame has two legs which are individually adjustable in length. Preferably each leg comprises an upper tube with a lower elongated screw telescoped into the tube in screw engagement with the tube. Thus manual rotation of the elongated screw varies the effective length of the leg. Each of the elongated screws is provided with handle means for manual rotation and the lower end of the elongated screw rests on a suitable pad or base in a rotatable manner.

The features and advantages of the invention may be understood from a following detailed description and the accompanying drawings.

BRIEF DESCRIPTION OF THE DRAWINGS

In the drawings which are to be taken as merely illustrative:

FIG. 3 is a side elevational view similar to FIG. 1 illustrating a second embodiment of the invention;

FIG. 4 is a section along the line 4—4 of FIG. 3 showing the second embodiment in side elevation;

FIG. 5 is a side elevational view illustrating a third embodiment of the invention;

FIG. 6 is a section along the line 6—6 of FIG. 5 showing the third embodiment in side elevation;

FIG. 6a is a fragmentary elevational view of a modification of the third embodiment;

FIG. 7 is a side elevational view of a fourth embodiment of the invention that serves the same purpose as the first three embodiments but is especially adapted for cooperation with a trailer that has a single pair of ground wheels;

FIG. 8 is a plan view of the embodiment shown in FIG. 7.

FIG. 9 is a side elevational view showing an auxiliary frame that is pivotally mounted on the underside of the tongue of a trailer; and FIG. 10 is a sectional along the line 10—10 of FIG. 9 showing the auxiliary frame in front elevation.

DESCRIPTION OF THE PREFERRED EMBODIMENTS OF THE INVENTION

Figure 1:
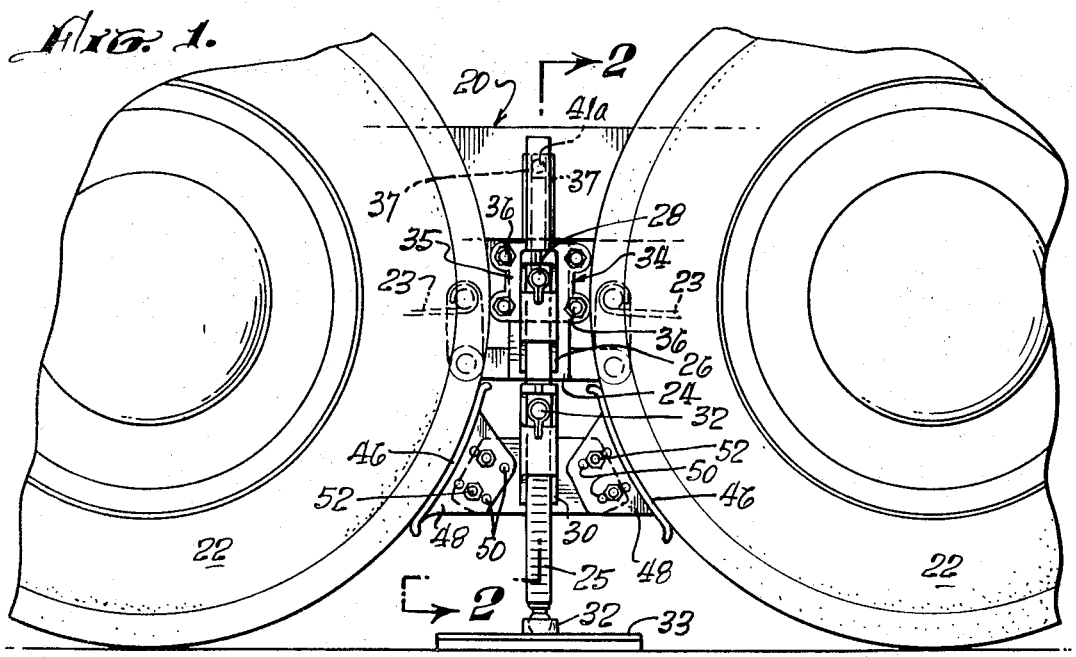
FIG. 1 is a side elevational view illustrating the first embodiment of the invention as used to exert lifting force on a trailer frame and simultaneously to immobilize a pair of the trailer wheels.
Figure 2:
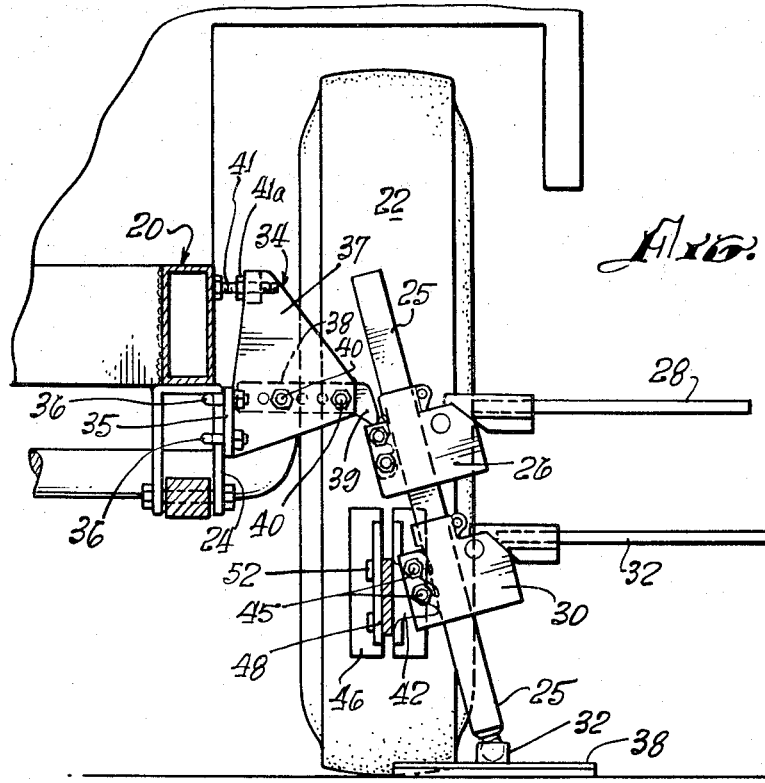
FIG. 2 is a section view along the line 2—2 of FIG. 1 showing the embodiment in side elevation.

The first embodiment of the stabilizer illustrated by FIGS. 1 and 2 is applicable to a trailer having a frame 20 and four ground wheels 22, there being a pair of the ground wheels on each side of the frame. The pair of ground wheels on each side of the frame are mounted in a well known manner on a pair of leaf springs 23 with the confronting ends of the leaf springs connected by links to a fixed spring stirrup 24 as shown. The stabilizer comprises a rack bar 25 on which is mounted an upper lifting assemblage 26 that is manually operable by a handle 28 and a lower lifting assemblage 30 that is manually operable by a handle 31.

The combination of a rack bar such as the rack bar 25 and a lifting assemblage such as the lifting assemblage 26 or the lifting assemblage 30 is disclosed in the two Ulm U.S. Pat. Nos. 3,124,013 and 3,163,925, which patents are hereby incorporated into the present disclosure by reference. In the Ulm disclosures a single lifting assemblage is employed to jack up a bumper of an automobile.

In FIGS. 1 and 2 the lower end of the rack bar 25 seats in a well known manner in a socket 32 of a base pad 33 and the upper lifting assemblage 26 places the rack bar under load by exerting lifting force on the trailer frame 20. Independently of the upper lifting assemblage 26, the lower lifting assemblage 30 is employed to immobilize the pair of ground wheels 22 on the corresponding side of the vehicle.

Since this function of the lower lifting assemblage 30 required that the statilizer be positioned between the two ground wheels 22, the trailer frame 20 is provided with a special bracket 34 which is sold with the stabilizer and which has a base plate 35 which is attached to the spring stirrup 24 by U-bolts 36. A pair of wings 37 welded by their edges to the base plate 35 straddle an adjustable bar 38 that has a downwardly directed nose 39 to seat on the upper lifting assemblage 26 and also has a series of bolt holes for engagement selectively by a pair of bolts 40. The two wings 37 carry at their rear edges a stop 41 which is adjustable to press against the trailer frame, the stop being in the form of an adjustable cap screw provided with a lock nut 42.

It is to be noted in FIG. 2 that the rack bar 25 is tilted inwardly toward the trailer frame to cause the rack bar to tend to thrust the trailer frame laterally toward the opposite side of the trailer. It is contemplated that two stabilizers shown in FIGS. 1 and 2 will be used on the opposite sides respectively of the trailer and will be inclined towards each other to hold the trailer frame against lateral displacement.

For the purpose of immobilizing the two ground wheels 22, the lower lifting assemblage 30 carries a bracket 42 which, as indicated in FIG. 2, has a pair of suitable downwardly inclined slots which releasably engage corresponding transverse bolts 45 of the lower lifting assemblage. The bracket 42 carries a pair of shoes 46 which are positioned at an angle relative to each other for the purpose of making pressure engagement with the two ground wheels 22. Since the spacing of the two side ground wheels varies from trailer to trailer the pair of shoes 46 is mounted on the bracket 42 in a manner that permits adjustment of each shoe relative to the bracket. In the construction shown each shoe has a pair of parallel wings 48 which straddle the bracket 42 and each of the wings has a plurality of bolt holes 50 which may be used selectively for bolts 52 to attach the shoes to the bracket.

The manner in which this first embodiment of the invention serves this purpose may be readily understood from foregoing description. To put the stabilizer in the sevice the base pad 35 is properly positioned on the ground with the rack bar 25 inclined inwardly in correct position for the upper lifting assemblage 26 to engage the nose 40 of the bracket 36. The handle 28 of the upper lifting assemblage 26 is then oscillated in the usual manner to cause the upper lifting assemblage to climb up the rack bar 25 until the upper lifting assemblage engages the nose 40 of the bracket 36 and takes up part of the weight of the trailer frame.

When a sufficient proportion of the weight of the trailer frame is taken by the upper lifting assemblage 36 for stabilization of the trailer frame, the lower lifting assemblage 30 is actuated by the lower handle 32 to cause the lower lifting assemblage to climb up the rack bar 25 until the two shoes 46 make adequate pressure contact with the two ground wheels 22. The two shoes, in effect, wedge into engagement with the two ground wheels.

In the preferred practice of the invention both of the stabilizers on the opposite sides of the trailer are provided with shoes 46 for pressure engagement with the corresponding pairs of ground wheels but it is necessary for only one of the stabilizers to be provided with a pair of the shoes. In other words the lower lifting assemblage 30 together with the corresponding bracket 42 and the corresponding shoes 46 may be omitted from the stabilizer on one side of the trailer frame.

It is to be noted that the two opposed stabilizers not only hold the trailer frame against lateral shift but also keep the trailer frame from oscillating about its longitudinal axis.

The second embodiment of the invention shown in FIGS. 3 and 4 is largely similar to the first embodiment, as indicated by the use of corresponding numerals to designate corresponding parts. The upper lifting mechanism 26a functions in the previously described manner to engage the nose 39 of the previously described trailer frame bracket 34. The lower lifting assemblage 30a actuates a pair of shoes 54 by means of a linkage which expands to place the shoes against the two ground wheels in response to upward movement of the lower lifting assemblage 30a relative to the upper lifting assemblage 26a. The linkage comprises two toggle linkages which actuate the two shoes 54 respectively.

Each of the two toggle linkages comprises a lower pair of coextensive parallel links 56 and an upper pair of coextensive parallel links 58. The lower pair of links 56 are pivotally connected to the upper pair of links 58 by a bolt 60 which carries the corresponding shoes 54. In the construction shown, each shoe 54 is formed with an ear 62 that is pivotally mounted on the corresponding bolt 60. The four lower links 55 are pivotally connected at their lower ends to a bolt 65 on the back of the lower lifting assemblage 30a. One of the pair of upper links 58 on one side of the rack bar 25a is pivotally connected to the upper lifting assemblage 26a by a bolt 66 on the back of the upper lifting assemblage and in like manner the other pair of upper links 58 on the other side of the rack bar are pivotally connected at their upper ends to a second bolt 66 on the back of the upper lifting assemblage.

In the operation of the second embodiment of the invention the upper lifting assemblage 26a is employed in the previously described manner to engage the trailer frame bracket 36 to exert an appropriate magnitude of lifting force on the trailer frame. During the upward movement of the upper lifting assemblage 26a by oscillation of the upper handle 28a the linkage that carries the two shoes 54 is more or less collapsed and out of the way. After the upper lifting assemblage 26a is adjusted to exert the desired lifting force on the trailer frame, the lower lifting assemblage 30a is actuated upward by the lower handle 32a to expand the linkage assembly and thus move the two shoes 54 into pressure engagement with the two ground wheels. It is to be noted that the linkage assembly automatically adjusts the spacing of the two shoes to whatever the spacing may be between the two wheels.

The principal parts of the third embodiment of the invention shown in FIGS. 5 and 6 include: an elongated screw 70; a base plate 72 having a socket 74 in which the ball-shaped lower end of the screw may be rotatably seated; a tube 75 slidingly telescoped over the upper end of the screw 70 and having an upper end wall (not shown) to limit its downward movement relative to the screw; a traveling nut 76 embracing the screw 70 for up and down travel in response to rotation of the screw; a ratchet mechanism 78 embracing the screw to rotate the screw reversibly; a handle 80 to oscillate the ratchet mechanism 78 the handle being connected to the ratchet mechanism by a pivot 82 to permit the handle to be folded upward out of the way; a sleeve 84 embracing the lower end of the tube 75, the sleeve having an internal screw thread in engagement with an external screw thread of the tube to permit the sleeve to be adjusted downwardly of the tube, the sleeve in effect making the tube adjustment downwardly in length; a pair of shoes 85 to make pressure contact against the two ground wheels 22 respectively; and a linkage, generally designated 86, for actuating the two shoes.

Here again the linkage 86 comprises two toggle linkages to actuate the two shoes 85 respectively, each toggle linkage including a pair of lower parallel links 88 that straddle the traveling nut 76 and a pair of upper parallel links 90 that straddle the tube 75. The lower ends of the lower links 88 are pivotally connected to the traveling nut 76 by bolts 92 on the forward and rearward sides of the traveling nut. The upper ends of the upper links 90 are pivotally connected to the tube 75 by bolts 94 on the front and rear sides of the tube. The linkage automatically adjusts the spacing of the two shoes in accord with the spacing between the two wheels.

Each of the two shoes 85 has an integral ear 98 with a pivot bolt 100 connecting the ear to the upper ends of the corresponding lower links 88 as well as to the lower ends of the corresponding upper links 90.

Here again, for cooperating with the stabilizer shown in FIGS. 5 and 6, the corresponding side of the trailer frame 20 is provided with a special triangular bracket 34a which is sold with the stabilizer and which is largely identical to the previously described bracket 34 as indicated by the corresponding reference numerals but differs in that the adjustable bar 38a is formed at its outer end with an upwardly turned hook 103 and a heel 104. A feature of this embodiment of the invention is that the upper end of the tube 75 is provided with a rigid stirrup or metal loop 105 to engage the hook 103 in a position with the upper end of the tube in abutment with the heel.

To put to use the stabilizer shown in FIGS. 5 and 6, first the stirrup 105 at the upper end of the tube 75 is engaged with the hook 103 with the device held in inclined position as shown by virtue of the abutment of the upper end of the tube 75 against the heel 104. At this time the screw 70 may be suspended from the tube by means of the linkage assembly 56 with the linkage assembly collapsed.

With the upper end of the tube 75 hooked to the bracket 102, both hands of the operator are free to maneuver the base plate 72 into proper position in engagement with the lower end of the screw 70. With the base plate 72 in engagement with the lower end of the screw 70 the operator may oscillate the handle 80 laterally to oscillate the ratchet mechanism 78 to cause pawl means (not shown) of the ratchet mechanism to engage peripheral teeth (not shown) of the screw for rotation of the screw in a well known manner. The manipulation of the handle 80 for this purpose by one hand of the operator may require that the screw 70 be grasped by the other hand to keep the screw from turning on both oscillations of the ratchet mechanism. The ratchet mechanism is reversible in a well known manner to cause the screw 70 to be rotated selectively in its two opposite directions.

At the start of the rotation of the screw 70 by the ratchet mechanism to shift the traveling nut 76 upward, the traveling nut may be spaced below the adjustable sleeve 84 and the nut merely travels upward without taking the weight of the load. The initial upward travel of the nut relative to the sleeve extension 84 of the tube 75 does, however, expand the linkage to spread the two shoes 85 apart. If the expansion of the linkage assembly brings the two shoes 85 into contact with the two corresponding ground wheels 22 with consequent resistance to expansion of the linkage before the traveling nut abuts the lower end of the adjustment sleeve 84, continued upward advance of the traveling nut will cause the linkage assembly to exert upward force on the tube 75. Thus the initial result of the upward movement of the traveling nut relative to the adjustment sleeve is to spread the two shoes 85 apart and then when the shoes make contact with the corresponding tires, continued upward travel of the nut increases the overall length of the stabilizer.

When the increase in the effective length of the stabilizer starts to lift the trailer frame the effect of continued upward travel of the nut 76 is divided between increased pressure of the two shoes against the two tires and increased lifting force on the trailer frame. Thus, between the moment the shoes tough the tires and the moment that the upwardly traveling nut 76 touches the lower end of the adjustment sleeve 84 the resistance to spreading of the two shoes against the two tires by expansion of the linkage is balanced with the resistance to lifting of the trailer frame by longitudinal expansion of the stabilizer. If the resistance to pressing the two shoes against the two tires is greater than the resistance to upward movement of the tube 75 by the linkage, the tube 75 will travel upward with very little expansion of the linkage and, on the other hand, when the resistance to upward movement of the tube 75 is greater than the resistance to expansion of the linkage. the effect of the further upward travel of the nut is to increase the pressure of the two shoes 85 against the two tires. It is apparent that the two shoes exert brake pressure in response to the load imposed on the jack by the trailer frame.

In the preferred procedure, the procedure that the operator will naturally follow after relatively little experience, the internally threaded sleeve 84 is adjusted in advance to a position sufficiently spaced from the traveling nut 76 to cause initial spreading of the two shoes against the two tires before the stabilizer takes on any substantial portion of the weight of the trailer frame. It is recommended that the internally threaded sleeve 84 be initially adjusted at a spacing from the traveling nut 76 of approximately three-eights of an inch when the spreading shoes 85 first make contact with the two tires. The upward travel of the nut 76 to close the ⅜ inch gap is sufficient to cause the shoes 85 to exert a desired magnitude of pressure against the two tires.

With the gap closed between the traveling nut and the adjusted sleeve, further rotation of the screw by the ratchet mechanism is translated directly into lifting of the trailer frame. If an initial gap of three-eights inch between the internally threaded sleeve and the traveling nut is not sufficient to create the desired shoe pressure by the time the nut reaches the sleeve the initial gap may be increased.

As heretofore indicated, the function of the internally threaded sleeve 84 is to make the tube 75 adjustable in length. If the stabilizer is designed for use with one particular trailer it may not be necessary to make the tube 75 adjustable and the internally threaded sleeve may be omitted.

A feature of this particular embodiment of the invention is that when the device is in use to stabilize and immobilize a trailer it may be locked against tampering or theft. For this purpose the traveling nut 76 may be provided with a pair of apertured ears 114 positioned to straddle the handle 80 when the handle is swung upward from the position shown in FIG. 6 to the position shown in FIG. 5. With the handle 80 in this upward folded position a padlock (not shown) may be engaged with the aperatured ears to captivate the handle in its folded position.

FIG. 6a shows how the screw 70 may be formed with an integral nut portion 70a of hexagonal configuration to permit the screw to be manually rotated by an open end wrench. This modification eliminates the need for the ratchet mechanism 78 and the handle 80.

In many respects, the fourth embodiment of the invention shown in FIGS. 7 and 8 is similar to the third embodiment, as indicated by the use of corresponding numerals to indicate corresponding parts. Whereas the third embodiment of the stabilizer cooperates with a pair of wheels on one side of a four-wheel trailer, the fourth embodiment is adapted for cooperation with a single wheel 22a on one side of a two-wheel trailer. In FIGS. 7 and 8 the trailer frame 20a is provided with a bracket 115 that is sold with the stabilizer and is attached to the trailer frame by bolts 116. The outer end of the bracket 115 is in the region of the single wheel and is formed with a hook 118 at its outer end for engagement by a stirrup 120 of the stabilizer in the manner heretofore described. In addition, the bracket 115 is provided with a lug 121 that is positioned to abut the side of the tube 75a of the stabilizer when the stabilizer is engaged with the hook 118.

The stabilizer is of the same general construction as shown in FIGS. 5 and 6 but has only a single shoe 122 to cooperate with the single wheel 22a, the single shoe being mounted on a toggle linkage comprising an upper pair of links 124 and a lower pair of links 125. The two pairs of links are interconnected by a pivot 126 on which the shoe is mounted and the upper links 124 are connected to the tube 75a by pivot 128 while the lower links 125 are connected to the traveling nut 76a by pivot 130.

The manner in which the stabilizer serves its purpose may be readily understood. In a previously described manner, the stabilizer is adjusted to take on a portion of the weight of the trailer frame and to place the shoe 122 in effective engagement with the single wheel 22a. The lateral reaction of the stabilizer to the pressure of the shoe 122 against the wheel is taken by the lug 120 on the bracket 115.

Each of the four embodiments of the invention described to this point provides a pair of stabilizing means for use on opposite sides of the frame of a trailer to immobilize the trailer with respect to lateral and longitudinal shift and with respect to oscillation about longitudinal and transverse axes of the trailer frame. The two stabilizers may also be adjusted to level the trailer frame axis laterally. For complete immobilization of the trailer frame and for longitudinal leveling of the trailer frame, additional means is required to elevate the front end of the frame and to anchor the front end of the frame against lateral oscillation about a vertical axis. This purpose may be served by the provision of an auxiliary frame of the character shown in FIGS. 9 and 10.

FIG. 9 shows how the forward tongue 132 of the trailer frame that is employed to hitch the trailer frame to a towing vehicle is provided with the usual screw jack 134 which is fixedly mounted on the tongue 132 and a screw 138 that extends through the tube in threaded engagement therewith, the screw being provided with a crank 136. A caster 140 which swivels on the lower end of the screw 138 may be raised and lowered by rotation of the crank 136. It is apparent that although the jack 134 may be used to level the trailer frame longitudinally the swiveled caster cannot prevent lateral shift of the trailer tongue and therefore cannot prevent oscillation of the trailer frame about a vertical axes. It is contemplated that the jack 134 will be employed first to lift the tongue 132 for longitudinal leveling of the trailer frame and that the weight of the tongue will then be transferred to an auxiliary frame that is generally designated 142 in FIGS. 9 and 10.

The auxiliary frame 142 has an upper transverse member 144 for cooperation with the trailer tongue 132 and has a pair of laterally spaced divergent legs. Each leg comprises an upper tube 145 that is rigidly connected to the upper transverse member 144 and a screw extension 146 that is threaded into a fixed nut 147 at the lower end of the tube, the two tubes being reinforced by cross braces 148. Each of the two screw extensions 146 seats at its lower end in a socket of a corresponding base plate, the base plate being captivated by the screw extension.

The auxiliary frame 142 may be separate from the trailer tongue 132 but in the preferred practice of the invention the auxiliary frame is mounted on the tongue in a manner that permits the auxiliary frame to be folded up out of the way when not needed. For this purpose the upper transverse member 144 of the frame is journaled at its opposite ends in sleeves 152 and each of the sleeves is provided with a pair of wings 154 by means of which the sleeve may be mounted on the underside of the trailer tongue by welding as shown.

When the auxiliary frame is folded upward to the position shown in broken lines in FIG. 9 it may be anchored in folded position by inserting pins 156 through diametrical bores 158 (FIG. 10) of the sleeves 152 with the pins extending through corresponding diametrical bores (not shown) of the upper transverse member 144.

Once a pair of stabilizers of any one of the four embodiments of the invention is adjusted on the two sides of the trailer frame with the trailer frame laterally level, the conventional jack 134 on the trailer tongue may be adjusted for the purpose of leveling the trailer frame longitudinally. Then the auxiliary frame 142 may be unfolded and adjusted to support the trailer tongue at the desired level. The procedure of adjusting the effective height of the auxiliary frame consists of rotating the extension screw 146 by means of diametrical handles 156 to adjust the effective length of the two legs of the auxiliary frame. Since the two legs of the auxiliary frame are adjustable independently it is a simple matter to adapt the auxiliary frame to any irregularity of the ground on which the two base pads 150 rest.

It is contemplated that the invention will be marketed as a kit, the full kit comprising a pair of stabilizers constructed in accord with any one of the four embodiments of the invention together with the auxiliary frame 142. Such a full kit includes a pair of brackets to be bolted on to the sides of a trailer frame to cooperate with the two stabilizers and a pair of winged sleeves for journaling the auxiliary frame on the tongue of a trailer.

The auxiliary frame 142 may be omitted from the kit if desired and it is also apparent that the shoe means of one of the two cooperating stabilizers may be omitted. Thus, if desired, a simple conventional jack may be substituted for one of the two stabilizers the jack serving merely to take a portion of the weight of the trailer frame without immobilizing the wheel or wheels on the corresponding side of the trailer frame. Thus a minimum kit could comprise a single stabilizer of the character of any one of the four embodiments of the invention, a corresponding bracket to be bolted on a trailer frame and a conventional jack to cooperate with the stabilizer.

My description in specific detail in the presently preferred embodiments of the invention will suggest various substitutions, changes and other departures from my disclosure within the spirit and scope of appended claims.

I claim:

1. Means to stabilize a parked trailer that has a frame and ground wheels, comprising the combination of:
   a jack to engage one side of the trailer frame to cooperate with a similar jack on the opposite side of the trailer frame;
   shoe means carried by the jack to exert pressure against at least one wheel of the trailer to serve as brake means to immobilize the wheel; and
   a mechanism on the jack operable to advance said shoe means into pressure contact with the wheel.

2. A combination as set forth in claim 1 in which the trailer has four ground wheels;
   in which said shoe means comprises a pair of shoes to engage two wheels on one side of the trailer;
   and in which said advancing means lifts the pair of shoes upward between the two wheels into wedging engagement with the two wheels.

3. A combination as set forth in claim 1 in which the trailer has four ground wheels;
   in which said shoe means comprises a pair of separate shoes;
   in which each of the two shoes is mounted on a corresponding expansible link means;
   and in which said mechanism is operatively connected to the two link means for expansion thereof to urge the two shoes into pressure engagement with two wheels respectively on said one side of the trailer.

4. A combination as set forth in claim 3 in which each of said expansible link means comprises a two-link toggle linkage.

5. A combination as set forth in claim 1 in which said jack includes a rack bar with teeth thereon;
which includes a first lifting assemblage on the rack bar to engage said teeth to exert lift force on the trailer frame;
and which includes a second lifting assemblage on the rack bar to advance said shoe means into pressure contact with said wheel.

6. A combination as set forth in claim 5 in which the trailer has four ground wheels;
in which the shoe means comprises two separate shoes;
in which each of the two shoes is mounted on a corresponding expansible link means;
and in which the second lifting assemblage is operatively connected to said two link means.

7. A combination as set forth in claim 1 in which said shoe means comprises a single shoe;
in which link means carries said shoe, said link means being expansible laterally of the jack from one side of the jack to force said shoe into pressure contact with a ground wheel of the trailer.

8. A combination as set forth in claim 7 which includes fixed means on the trailer frame positioned for abutment against the other side of the jack to oppose lateral shift of the jack in reaction to the force exerted by the link means.

9. A combination as set forth in claim 1 which includes means to releasably connect the upper end of the jack to the trailer frame to temporarily suspend the jack from the frame to facilitate manual adjustment of the jack for exerting lifting force on the frame.

10. A combination as set forth in claim 9 which includes hook means on one of said jack and said trailer frame and loop means on the other of said jack and said trailer frame to engage the hook means to temporarily suspend the jack from the trailer frame.

11. A combination as set forth in claim 1 in which said jacks includes:
an elongated support scew;
a tube slidingly mounted on the upper end of the screw and longitudinally extendible therefrom to exert lift force on the trailer frame;
means operable to rotate the screw;
a nut on the screw to travel longitudinally of the screw in response to rotation of the screw, said tube being in the path of the nut to permit the tube to be raised by the nut; and
link means carrying said shoe means, said link means being connected both to said tube and said nut and being expansible by upward movement of the nut relative to the tube thereby to advance the shoe means.

12. A combination as set forth in claim 11 in which said tube is adjustable downward in effective length to vary the point in the upward travel of the nut at which the nut abuts the lower end of the tube to lift the sleeve.

13. A combination as set forth in claim 12 in which said tube is adjustable downward in length by screw action.

14. A combination as set forth in claim 13 in which said tube carries a downward extension sleeve said extension sleeve screw-threadedly engaging the tube for downward adjustment of the effective length of the tube.

15. A combination as set forth in claim 11 in which the trailer has four ground wheels;
in which the shoe means comprises two separate shoes for braking action against two corresponding ground wheels on one side of the trailer;
and in which said two shoes are carried by two corresponding expansable linkages, each linkage being operatively connected both to the tube and the nut.

16. A combination as set forth in claim 11 in which said shoe means comprises a single bore;
in which said single shoe is mounted on a corresponding linkage which expands laterally of one side of the jack to advance the shoe into pressure contact with a ground wheel of the trailer.

17. A combination as set forth in claim 16 in which fixed means on the trailer frame is positioned to abut the opposite side of the jack to resist lateral shift of the jack in response to expansion of the link means.

18. A combination as set forth in claim 11 which includes means to releasably connect the upper end of the sleeve to the trailer frame for temporary suspension of the jack from the trailer frame to facilitate manual adjustment of the jack in preparation for the lifting action of the jack against the trailer frame.

19. A combination as set forth in claim 11 in which said means operable to rotate the screw comprises a manually operable reversible rachet mechanism.

20. A combination as set forth in claim 11 in which said means operable to rotate the screw comprises a nut integral with the screw for reversible rotation by wrench means.

21. A combination as set forth in claim 1 in which said jack includes:
an elongated screw;
a tube slidingly mounted on the upper end of the screw for extension therefrom against the trailer frame to exert lift force on the trailer frame;
means operable to rotate said screw;
a nut on the screw to travel up and down thereon in response to rotation thereof, said tube being in the path of upward travel of the nut to be lifted by the nut;
and means responsive to upward travel of the nut relative to the tube to advance said shoe means.

22. A combination as set forth in claim 21 in which said tube is adjustable downward in effective length to vary the point in the upward travel of the nut at which the nut exerts lifting force on the tube.

23. A combination as set forth in claim 1 which includes a bracket for mounting on one side of the trailer frame to receive the lifting thrust of the jack.

24. A combination as set forth in claim 23 in which said bracket is made in two sections adjustable relative to each other to vary the effective length of the bracket.

25. A combination as set forth in claim 24 in which said bracket includes means to engage a spring stirrup on one side of the trailer frame and further includes means to thrust against the trailer frame above the spring stirrup.

26. A combination as set forth in claim 23 in which the upper end of the jack and said bracket are provided respectively with cooperative means to suspend the jack from the bracket in preparation for operating the jack.

27. A combination as set forth in claim 26 in which the upper end of the jack and said bracket are provided respectively with cooperative means for mutual abutment to hold the suspended jack in a position tilted towards the trailer.

28. In an assembly for stabilizing a parked trailer wherein the trailer has a plurality of ground wheels and a frame with a forward tongue for connection to a powered vehicle, the combination of:
two jack means for use on the opposite sides respectively of the trailer to bear part of the weight of the trailer frame to prevent rocking of the trailer frame about its longitudinal axis;
shoe means carried by at least one of said jacks;
a mechanism on said one jack to advance said shoe means into pressure contact with a ground wheel of the trailer to immobilize the ground wheel; and
additional means effective between the ground and said tongue of the trailer frame to prevent lateral movement of the forward extension and to bear a portion of the weight of the trailer frame to cooperate with said two jacks to prevent rocking of the trailer frame about an axis extending transversely of the trailer frame.

29. A combination as set forth in claim 28 in which the tongue of the frame is provided with an auxiliary jack to raise and lower the forward end of the frame;
and in which said additional means is an auxiliary support frame for positioning transversely of the longitudinal axis of the trailer frame to receive a portion of the weight of the trailer frame,
whereby the tongue of the trailer frame may be lifted by the auxiliary jack and they may be lowered onto the auxiliary support frame.

30. A combination as set forth in claim 29 in which said auxiliary support frame has a pair of spaced legs with pads thereon to transmit to the ground the weight imposed on the auxiliary support frame, said legs being adjustable in length to level the auxiliary support frame on uneven ground.

31. A combination as set forth in claim 30 in which said auxiliary support frame has a pair of tubular legs;
in which a pair of elongated scews are telescoped into the lower ends of the tubular legs respectively in screw threaded engagement therewith;
and in which said pads are on the lower ends of said elongated screws.

32. A combination as set forth in claim 29 in which said auxiliary support frame is mounted on said forward extension of the trailer frame for movement relative to the forward extension between an upper retracted position and a lower effective position.

33. A combination as set forth in claim 32 in which said auxiliary support frame is swingably mounted on the forward extension and which includes means to releasably hold the auxiliary support frame in its upper retracted position.

34. In a trailer having a frame mounted on ground wheels, the combination of:
a tongue on the forward end of the trailer frame for hitching to a towing vehicle;
an auxiliary jack carried by the tongue for raising and lowering the tongue;
an auxiliary support frame for positioning transversely under the tongue to hold the tongue at an elevation to level the trailer frame longitudinally and to prevent lateral shift of the tongue,
said auxiliary support frame being adjustable in vertical dimension and being adjustable to compensate for unevenness in the ground on which it rests,
whereby the opposite sides of the trailer frame jacked up to keep the trailer frame from rocking on its longitudinal axis, the forward extension of the trailer frame may be elevated by the auxiliary jack and then lowered to rest on the auxiliary support frame with the auxiliary support frame adjusted in height for longitudinally leveling of the trailer frame and adjusted as necessary to compensate for unevenness of the ground under the auxiliary support frame.

35. A combination as set forth in claim 34 in which said auxiliary support frame has opposite side legs,
said legs being individually adjustable in length to vary the effective height of the auxiliary support frame and to compensate for unevenness of the ground under the auxiliary support frame.

36. A combination as set forth in claim 35 in which the upper portion of each of said legs is in the form of a tube;
in which the lower portion of each of said legs is an elongated screw telescoped into the tube in screw-threaded engagement therewith.

37. A combination as set forth in claim 36 which includes a pad at the lower end of each of said elongated screw for contact with the ground, the elongated screw being rotatable relative to the pad and being provided with handle means for manual rotation.

38. A combination as set forth in claim 35 in which said auxiliary support frame is mounted on the said tongue for movement relative thereto between an upper retracted position and a lower effective position.

39. A kit for stabilizing a parked trailer, including:
a pair of jack means for use on opposite sides of the trailer frame to take on a portion of the weight of the trailer to stabilize the trailer against lateral shift and against oscillation about the longitudinal axis of the trailer frame; and
means on at least one of the said jack means to engage at least one wheel on the corresponding side of the trailer to immobilize the wheel said means on at least one of the said jack means comprising;
show means for pressure engagement with at least one wheel of the trailer; and a lifting assemblage on said one jack means to actuate said show means.

40. A kit as set forth in claim 39 in which each of the two jack means is equipped with shoe means together with a lifting assemblage to actuate the shoe means.

41. A kit as set forth in claim 39 which includes an auxiliary frame for positioning under the tongue of the trailer frame transversely thereof to support the front end of the trailer frame and to immobilize the trailer frame against oscillation about a vertical axis.

42. A combination as set forth in claim 41 which includes means to pivotally mount the auxiliary frame on the trailer tongue to permit the auxiliary frame to be carried by the trailer tongue and to permit the auxiliary frame to be folded upward out of the way when it is not needed.

43. A kit as set forth in claim 42 which includes means to releasably hold the auxiliary frame in its upper folded position.

44. A kit as set forth in claim 43 in which the auxiliary frame is journaled on a cross bar and which includes pin means insertable into a bore of the transverse bar in engagement with the auxiliary frame to releasably hold the auxiliary frame in its proper folded position.

45. Means for use with a parked trailer having a frame and ground wheels to immobilize and stabilize the trailer frame to bear part of the weight of the trailer frame to prevent rocking of the trailer frame about its longitudinal axis;
 shoe means on at least one of said two jack means;
 mechanism on said one jack means operative to place said shoe means against at least one wheel of the trailer to prevent longitudinal shift of the trailer; and
 auxiliary means for use at one end of the trailor to act between the ground and the trailer frame to cooperate with said two jack means to prevent rocking of the trailer frame about a transverse axis.

46. A combination as set forth in claim 45 in which the auxiliary means anchors the trailer frame against oscillation about a vertical axis.

47. Means to stabilize a parked trailer that has a frame and ground wheels, including the combination of:
 a jack to rest on a ground surface and to engage one side of the trailer frame to exert lifting force thereon;
 shoe means carried by the jack to exert pressure against at least one ground wheel of the trailer to serve as brake means to immobilize the ground wheel; and
 a mechanism on the jack operable to advance the shoe means against the ground wheel,
 said mechanism being responsive to the load imposed on the jack by the trailer frame to exert pressure on the wheel in response to the load.

48. A combination as set forth in claim 47 in which said jack includes a longitudinally expansible support structure
 which includes expansible link means carrying said shoe means for actuation thereof;
 and which includes a single mechanism operable both to expand the support structure longitudinally and to expand said link means to advance said shoe means.

* * * * *